United States Patent

[11] 3,570,340

[72] Inventor Howard A. Rohdin
 Waquoit, Mass.
[21] Appl. No. 705,112
[22] Filed Feb. 13, 1968
[45] Patented Mar. 16, 1971
[73] Assignee Packaging Industries, Inc.
 Hyannis, Mass.

[54] ROLLER DIECUTTING MACHINE OR THE LIKE
 27 Claims, 26 Drawing Figs.
[52] U.S. Cl. .................................................. 83/55,
 83/512, 83/527, 83/547, 83/659, 100/210,
 100/295
[51] Int. Cl. ...................................................... B26d 1/02,
 B26f 1/00
[50] Field of Search ......................................... 83/512,
 510, 509, 284, 547, 540, 434, 539, 531, 533, 542,
 55, 31; 100/162 (B), 295, 210, 258, 211

[56] References Cited
 UNITED STATES PATENTS
| 487,840 | 12/1892 | Kaufman | 83/510 |
|---|---|---|---|
| 3,213,737 | 10/1965 | Wright | 83/510X |
| 3,237,499 | 3/1966 | Lohrand et al. | 83/510 |
| 3,301,110 | 1/1967 | Stegner | 83/284UX |

FOREIGN PATENTS
| 1,001,590 | 8/1965 | Great Britain |
|---|---|---|
| 1,446,370 | 6/1966 | France |

*Primary Examiner*—Frank T. Yost
*Attorneys*—Kenyon and Kenyon Reilly, Carr & Chapin ABSTRACT: A roller diecutting machine in which the passage of a plurality of rollers causes a workpiece and a die to be forced into a cutting engagement. In accordance with one of the improvements the rollers are guided by their supporting bearings in a manner which causes the path of travel of the surface of successive rollers to be closer to the workpiece and thereby incrementally increase the cutting force applied by the rollers to the workpiece. Thus the cutting force of successive rollers can be increased by changing the diameter of the bearings which position each roller with respect to the workpiece or by providing different paths of travel for guiding the bearings of each successive roller to be incrementally closer to the workpiece. Other improvements include the directing of the rollers by means of irregular cam surfaces to move in and out with respect to the workpiece as the rollers are advanced. A further improvement includes the use of a contoured or a formed die which is adapted to transmit incrementally increasing cutting forces to a workpiece.

INVENTOR.
HOWARD A. ROHDIN
BY Kenyon & Kenyon
ATTORNEYS

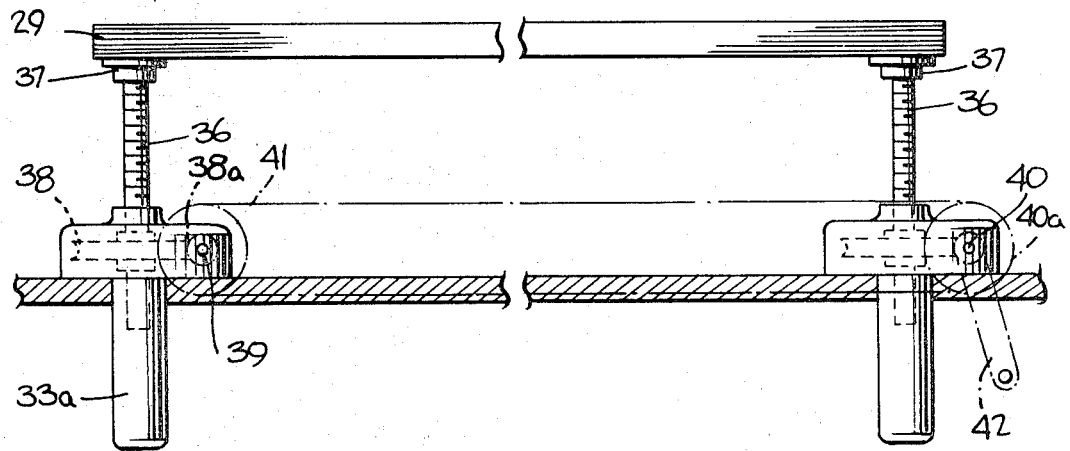
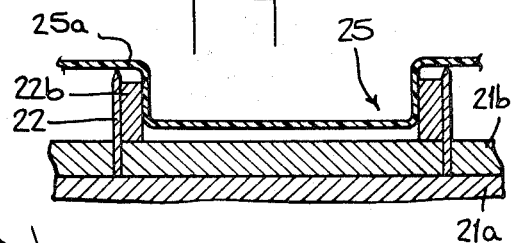
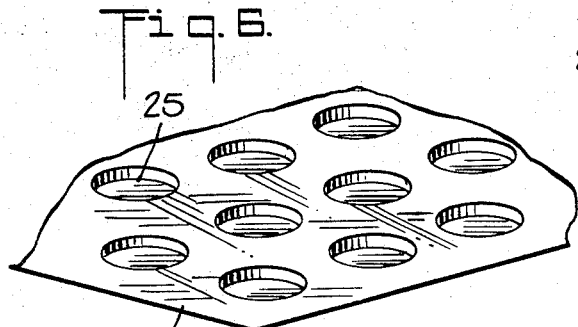
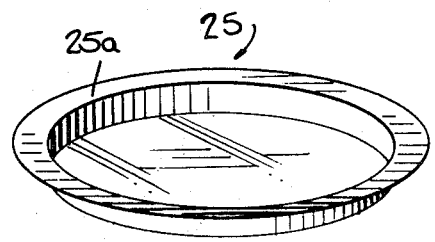
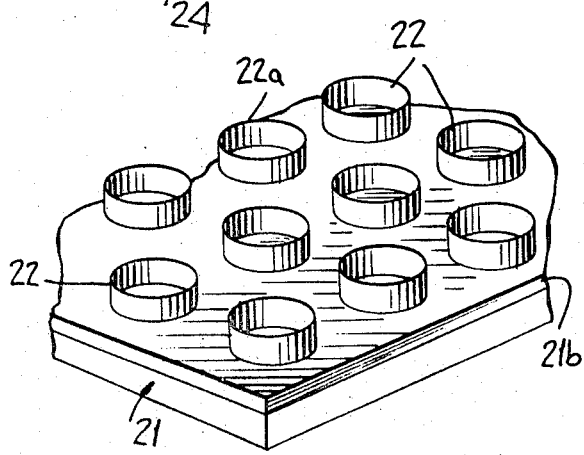

INVENTOR.
HOWARD A. ROHDIN
BY
Kenyon & Kenyon
ATTORNEYS

INVENTOR.
HOWARD A. ROHDIN
BY Kenyon & Kenyon
ATTORNEYS

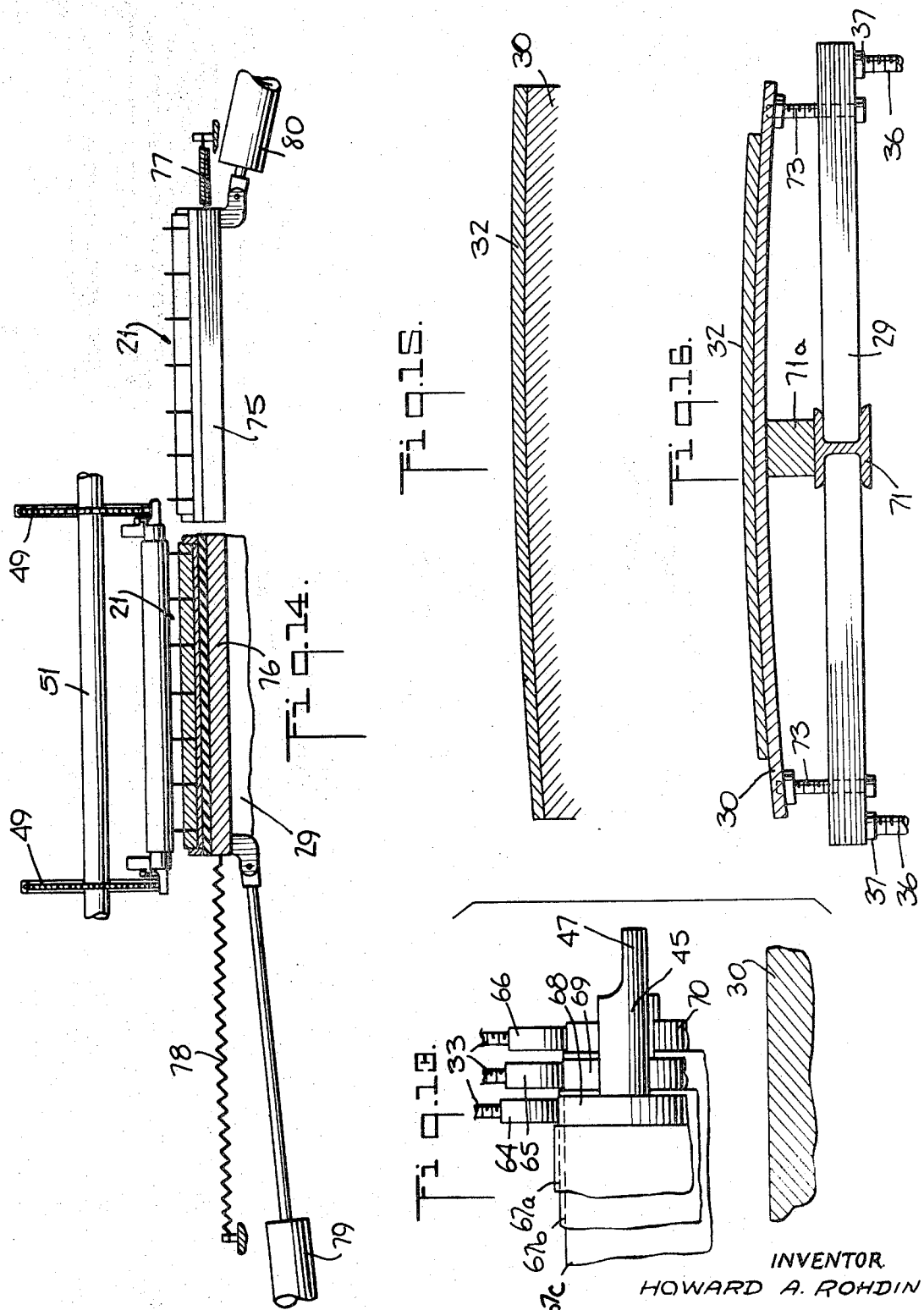

Patented March 16, 1971

INVENTOR.
HOWARD A. ROHDIN

BY Kenyon & Kenyon

ATTORNEYS

Patented March 16, 1971

INVENTOR.
HOWARD A. ROHDIN
BY
Kenyon & Kenyon
ATTORNEYS

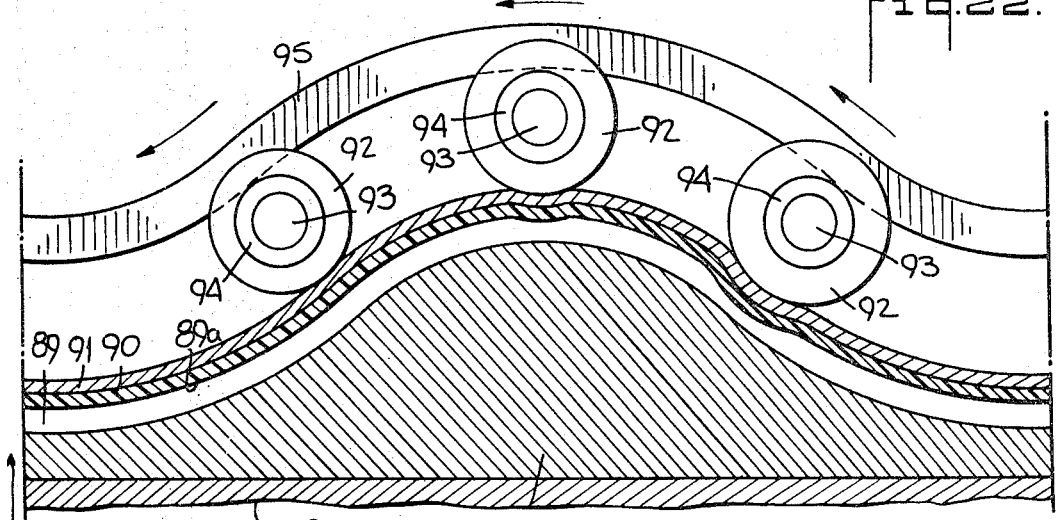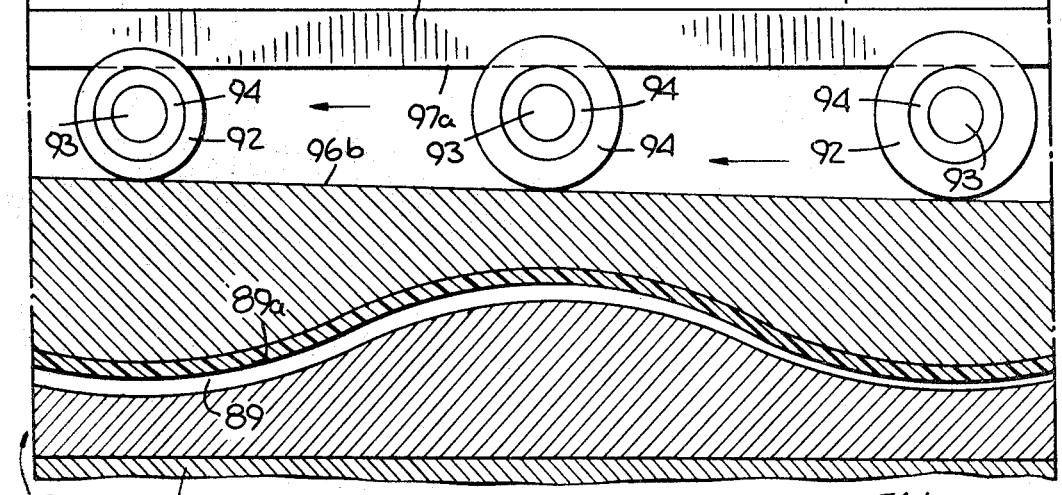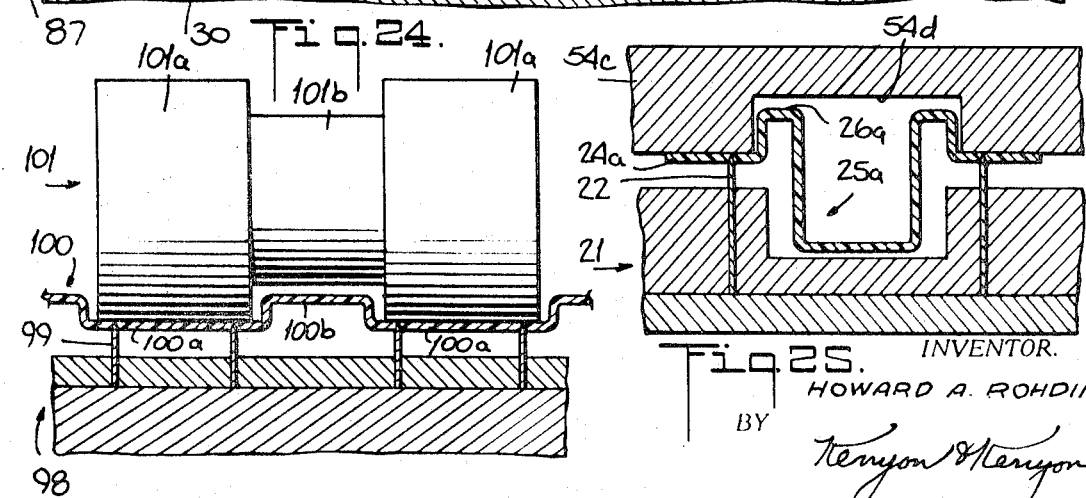

ROLLER DIECUTTING MACHINE OR THE LIKE

BACKGROUND OF THE INVENTION

The invention relates to roller diecutting machines and, in particular, to machines used to cut plastic blisters from a sheet of preformed blister packaging material.

In conventional roller diecutting machines, such as shown in U.S. Pat. No. 3,213,737, issued on Oct. 26, 1965, to David C. Wright, a workpiece which is placed between a cutting plate and a die is cut by a single pass of a roller across the cutting plate. The need to cut the workpiece completely through during a single pass of the roller places undue requirements upon the roller and the die. Thus the cutting is conventionally completed by a single pass of the roller regardless of the type or thickness of the material being cut. When the resistance presented by the workpiece to the roller force is greater than the roller force, the workpiece will not be completely cut by the roller movement. On the other hand, when that resistance of the workpiece to cutting is slightly less than the roller force, the cut made in the workpiece will have undesirable ragged edges.

SUMMARY OF THE INVENTION

It is an object of the invention to increase the engagement of successive rollers of a roller diecutting machine, such as successive rollers of the same diameter, to incrementally increase the force applied by the rollers to a workpiece.

It is another object of the invention to increase the force to be applied by the rollers by incrementally determining the path of travel of the surface of each successive roller to be closer to the workpiece in response to a guidance of the roller by its supporting means.

It is an additional object of the invention to incrementally increase the force to be applied by each successive roller by controlling the path of travel of each successive roller independent of the other rollers.

It is a further object of the invention to provide for the predetermined movement of the roller or rollers when applying load to urge a workpiece with respect to a cutting die, the predetermined movement of the roller being toward and away from the cutting die.

Other objects of the invention and a fuller understanding of the invention are had by reference to the description of embodiments and the claims, taken in conjunction with the drawings.

BRIEF DESCRIPTION OF THE DRAWINGS

In the drawings:

FIG. 5 shows, in schematic form, apparatus for adjusting the height of the cutting table of the machine.

FIG. 6 is a fragmentary perspective view of the cutting die with a workpiece to be cut adjacent thereto;

FIG. 7 is a perspective view of one of the blisters after being cut from a sheet of blisters;

FIG. 13 is a fragmentary front elevation view of the apparatus of FIG. 12;

FIG. 14 is a fragmentary vertical section view of another embodiment of the machine of FIG. 1 which includes means for automatically conveying cutting dies and workpieces to the cutting table of the machine;

FIG. 15 is a fragmentary vertical section view of one embodiment of the invention for compensating the backup plate for the roller deflection that occurs when the rollers move across the wear plate; and FIG. 16 is a fragmentary vertical section view of another embodiment of the invention for compensating for the roller deflection;

FIG. 21 is a fragmentary vertical section view showing a blister being piloted with respect to a die by an insert within the die;

FIG. 22 is a fragmentary vertical section view showing a diecutting assembly having a contoured cutting edge, and an arrangement of rollers for applying cutting pressure to the edge;

FIG. 23 is a fragmentary vertical section view of a contoured cutting die and a flat work plate for applying roller pressure to a die;

FIG. 24 is a fragmentary vertical section view of a stepped roller for applying pressure to a workpiece disposed upon a cutting die;

FIG. 25 is a fragmentary vertical section view of a wear plate which has been relieved in order to accommodate a raised portion of the blister which is to be severed from a web; and FIG. 26 is a fragmentary vertical section view of a machine in accordance with the invention and showing a die and a workpiece thereon which are adapted to be advanced by a ram beneath a plurality of rollers each having an incrementally larger outside diameter.

DESCRIPTION OF THE PREFERRED EMBODIMENTS

The roller cutting die machine, constructed in accordance with the invention, can be used to cut sheets of paper, paperboard, rubber, leather, cloth, aluminum, steel as well as sheets of plastic. A specific example of use is to cut plastic sheets (FIG. 6) containing a plurality of blisters 25 (FIG. 7) into individual blisters which are used in packaging a variety of products.

Figure 1:
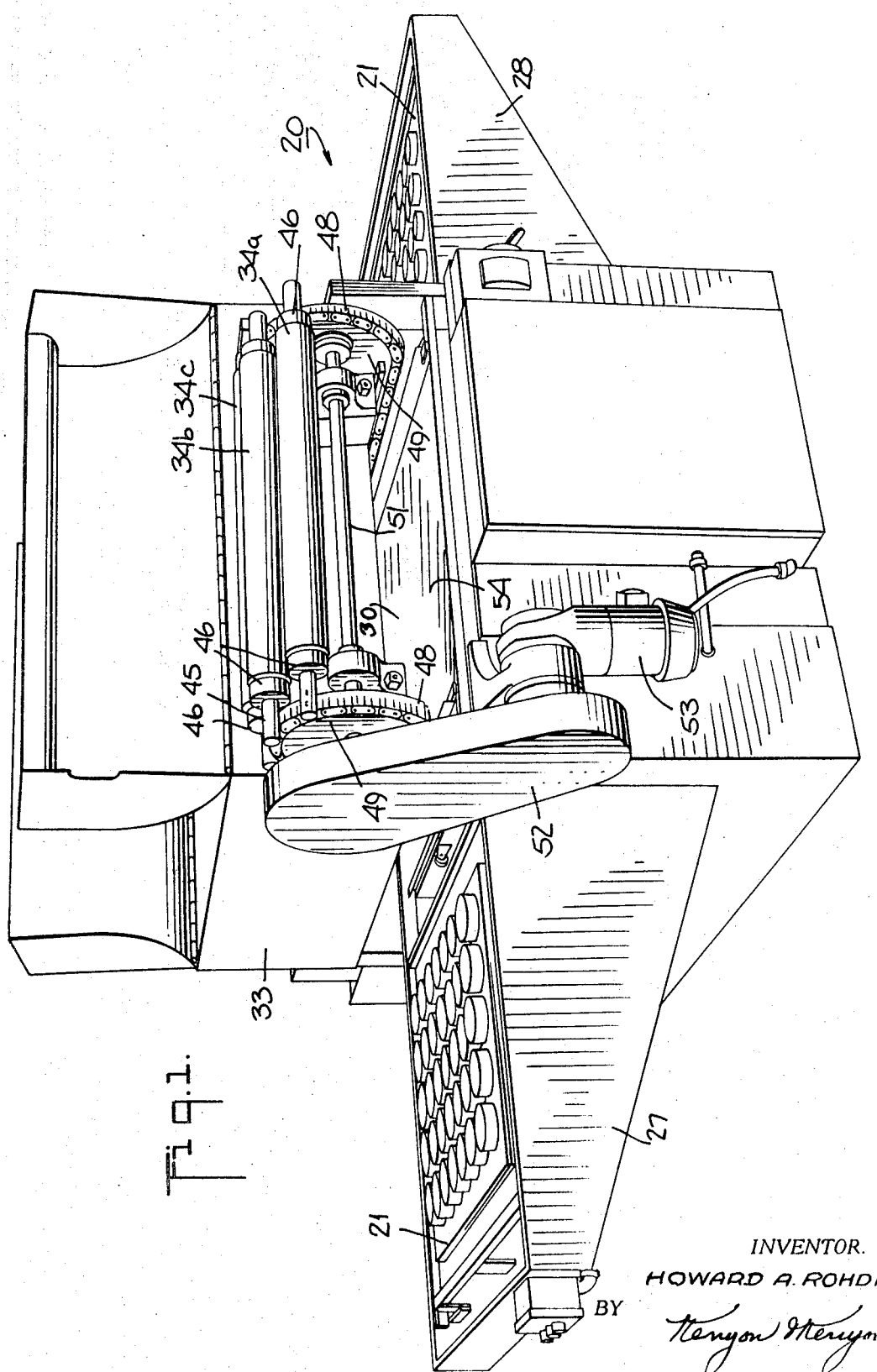
FIG. 1 is a perspective view of a roller diecutting machine constructed in accordance with the invention.
Figure 4:
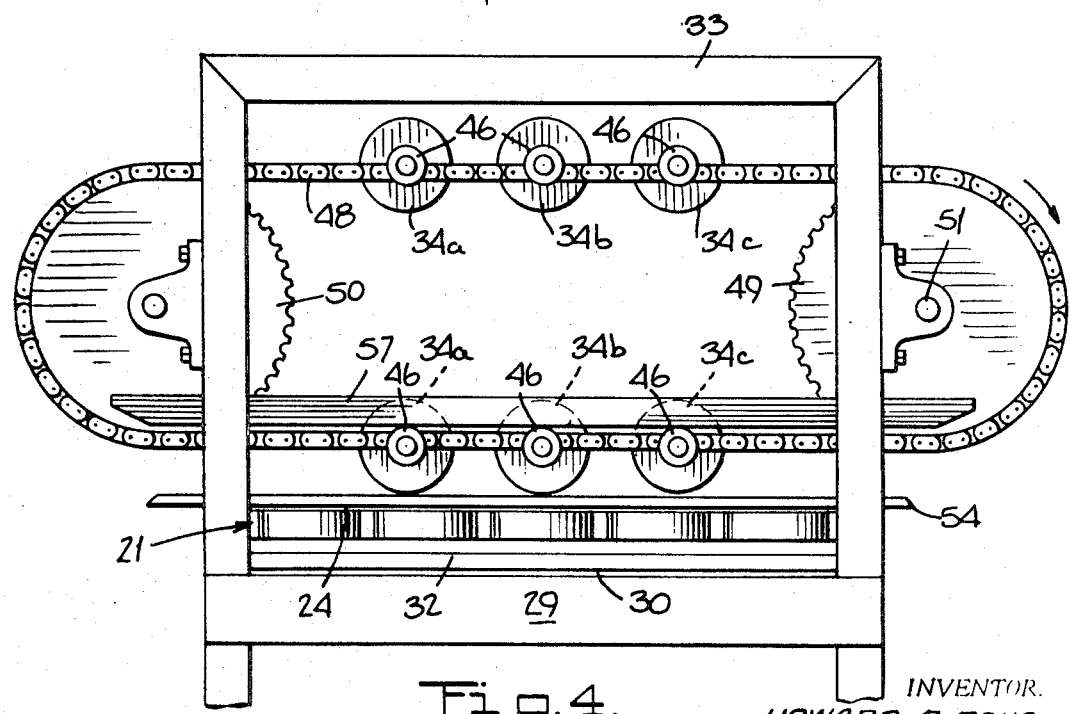
FIG. 4 is a vertical section view of a portion of the machine substantially corresponding to FIG. 3 and showing another height adjustment of the rollers with respect to the bed of the machine.
Figure 8:
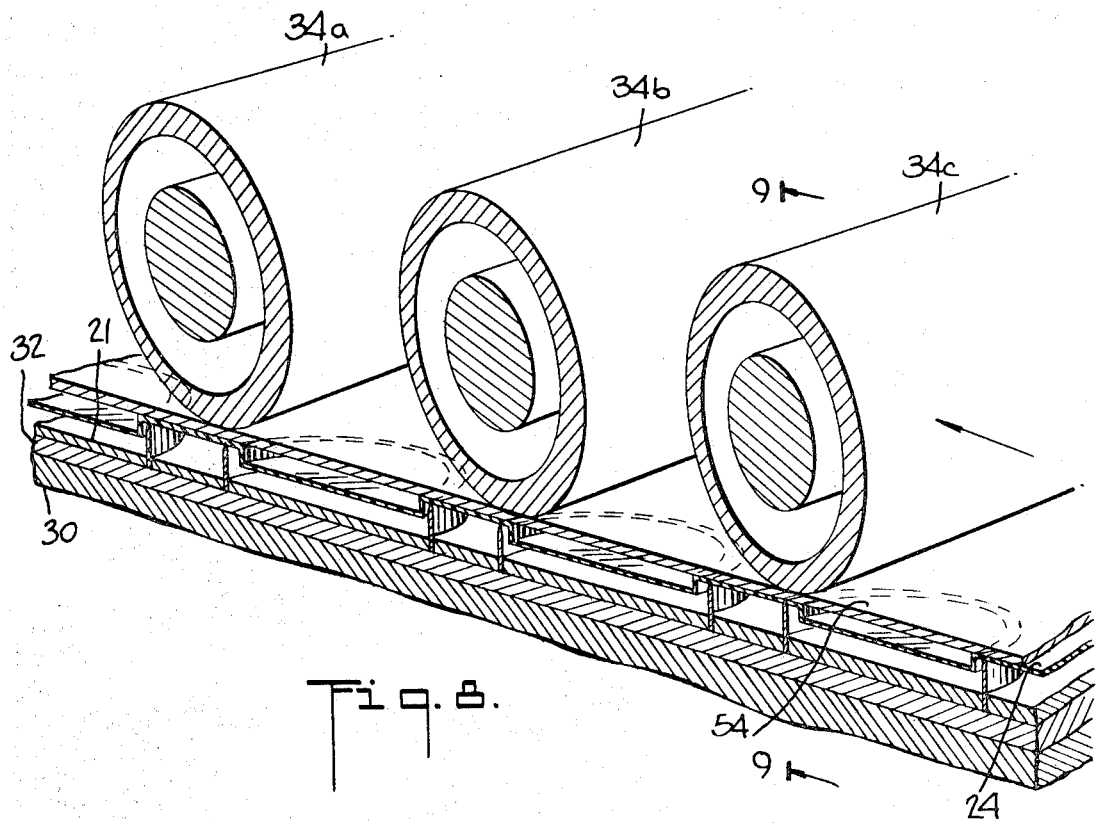
FIG. 8 is a vertical section view of a perspective view showing the cutting rollers being advanced across the cutting die.

Referring to FIG. 1, a roller diecutting machine 20 constructed in accordance with the invention includes cutting die assembly 21 which is adapted to be alternately positioned on table 30 mounted upon bed 29 (FIG. 4). The cutting die assembly 21 which includes a plurality of individual dies 22 is alternately fed to the table 30 (FIG. 1) from the sides 27, 28 of the machine. The plurality of dies 22 (FIG. 6) are mounted upon support 21a and extend through sheet 21b which serves to maintain the dies in position. In the alternative, cutting dies 22 can be physically attached to the wear plate 54 (FIG. 2), that is described in more detail below.

The cutting die assembly 21 (FIG. 6) which can be in the form of one or more steel rule dies includes a plurality of knife edges 22a formed from a plurality of hollow metal cylinders. Knife edges 22a can be used for the purpose of cutting blisters 25 from a web of plastic material which contains a plurality of regularly spaced blisters. The radius of the metal cylinders is larger than the radius of blisters 25 if blisters 25 are to have flange 26. It is to be understood, however, that other specific configurations of knife edge 22 can be used when other specific product shapes are desired.

As shown in FIG. 21, an insert 22b can be inserted within steel rule die 22. The annular insert is shaped to engage and locate the blister with respect to the die to insure that after cutting the flange 25a is concentric with blister 25. A plurality of inserts can be distributed at a number of locations throughout the die assembly 21.

Figure 2:
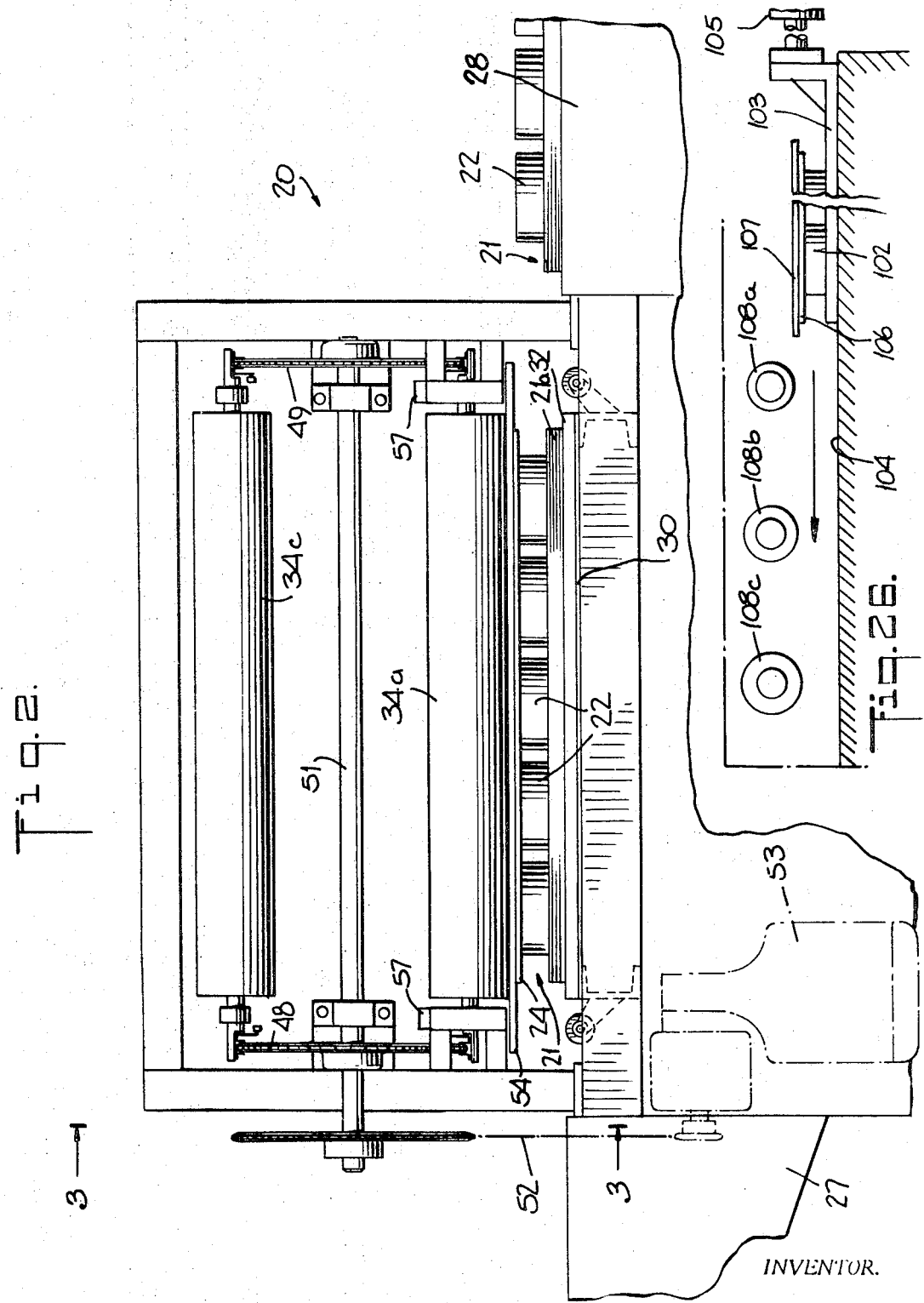
FIG. 2 is a front elevation view of the machine shown in FIG. 1.

As shown in FIG. 2, the cutting die assembly 21 which is adapted to receive a workpiece 24 to be cut is positioned upon a flexible hard steel plate 32 overlying table 30. An additional force dampening means 31 (FIG. 3), such as a sheet of hard elastomeric material, for example, butyl rubber, thermoprene, or phenoaldehyde rubber mixtures can be sandwiched between the top of table 30 and the steel plate 32.

FIG. 2 shows wear plate 54 disposed above workpiece 24 which is placed across dies 22. The cutting die assembly is shown disposed upon plate 32 resting on table 30. In operation, the rollers press wear plate 54 downwardly and sever the blisters from the web along the lower surface of the wear plate.

In the alternative, cutting die assembly 21 can be inverted and mounted with respect to the lower surface of wear plate 54 with dies 22 extending downwardly. With such an alternate arrangement, the workpiece is placed on plate 32, underlying the cutting edges of the dies. In this way, plate 32 becomes a cutting surface. When the rollers pass over wear plate 54, the wear plate and the cutting die assembly mounted with respect thereto are urged downwardly to sever the blisters against plate 32.

Cutting is accomplished by passing rollers 34a—c across wear plate 54 overlying workpiece 24 positioned on die assembly 21. The rollers urge the wear plate toward the die assembly with incrementally increasing force so that the dies 22 progressively cut the workpiece.

In actual operation of the cutting machine, the rollers tend to deflect upwardly at the central portion thereof as the rollers are advanced to apply cutting forces to the work piece 24. To assist in maintaining the rollers in a cylindrical form under load, the rollers can be crowned, thereby having a slightly greater diameter at the middle. Another arrangement for compensating for the deflection of the rollers is the supporting of the cutting table 30 (FIG. 16) at the center by a beam such as I-beam 71 which extends in a direction parallel to the path of movement of the rollers. With a central support, the top of table 30 can deflect as a cantilever at each side of the I-beam and thereby conform to the deflected rollers.

A uniform engagement of the length of each roller to the die on table 30 can be obtained by prestressing the table with respect to I-beam 71 located along the centerline thereof. Sufficient prestress is exerted on the cutting table top by means of a series of bolts 73, secured to the longitudinal edges of the table parallel to the path of travel of the rollers, to conform it to the concave bend imparted to the roller. In another embodiment, steel plate 32 (FIG. 15) can be prestressed and thereby deflected during fabrication and subsequently welded in order to conform the plate to the concave bend imparted to the rollers.

Figure 19:
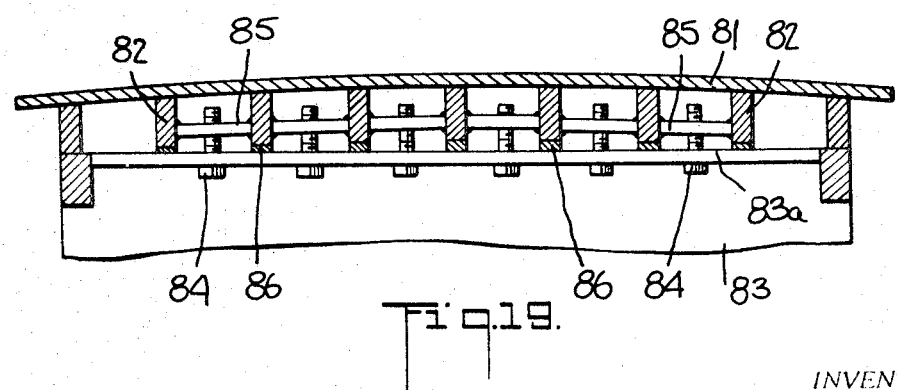
FIG. 19 is a vertical section view showing another embodiment of the invention for deflecting the worktable.

Another embodiment of the table is shown in FIG. 19. Table 81 is deflected about a transverse axis extending at substantially right angles to the path of travel of the rollers. Table 81 can also be deflected in the manner shown in FIG. 16. Reinforcing ribs 82 support table 81 with respect to beam 83, such as an I-beam, having flanges 83a. Screws 84 extend through flanges 83a and are threadedly engaged to plates 85 secured to ribs 82. Shims 86 of different thickness are placed between ribs 82 and flange 83a. Thus as screws 84 are tightened, table 81 is deflected toward beam 83 in a manner determined by the selection of the different thickness of shims 86.

Figure 20:
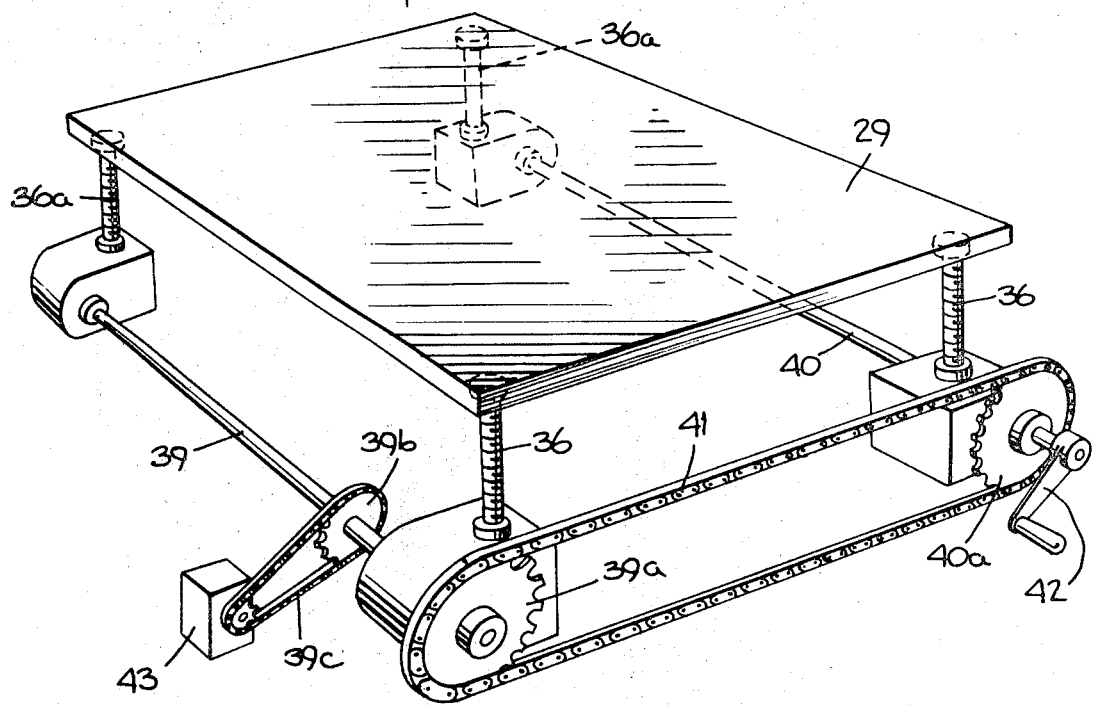
FIG. 20 is a perspective view of the mechanism for raising and lowering the bed of the machine upon which the worktable can be mounted.

In order to accommodate dies 22 of different heights, the height of the bed 29 is adjustable with respect to the machine superstructure 33 which includes at least one roller 34 and a means, coacting with the roller, for applying incrementally increasing roller forces to the workpiece 24 to be cut on the die. Referring to FIG. 5, jackscrews 36 extend through threaded holes in sockets 33a mounted in the main frame of the machine. Flanges 37 are pivotally mounted over the upper ends of the screws 36 and attached against the bottom surface of the bed 29. Wheel 38 is threadedly engaged to shaft 36. Worm 38a engaged with wheel 38 is driven by shaft 39. A pair of shafts 39 and 40 drive screws 36 and 36a at each of the corners of table 30 (FIG. 20). Shaft 39 is connected by a sprocket 39a and chain 41 to a shaft 40. Crank 42 drives shaft 39, and shaft 40 through sprocket 40a and chain 41.

As shown in FIG. 20, shafts 39 and 40 also drive screws 36a disposed opposite to screws 36. As a result, the four corners of bed 29 can be simultaneously raised or lowered and therefore the bed can be maintained level during adjustment thereof. A counter mechanism 43 is connected to shaft 39 by sprocket 39b and chain 39c to indicate the extent of adjustment and thereby enable the table 30 to be repositioned to the same level in successive setting operations.

Figure 3:
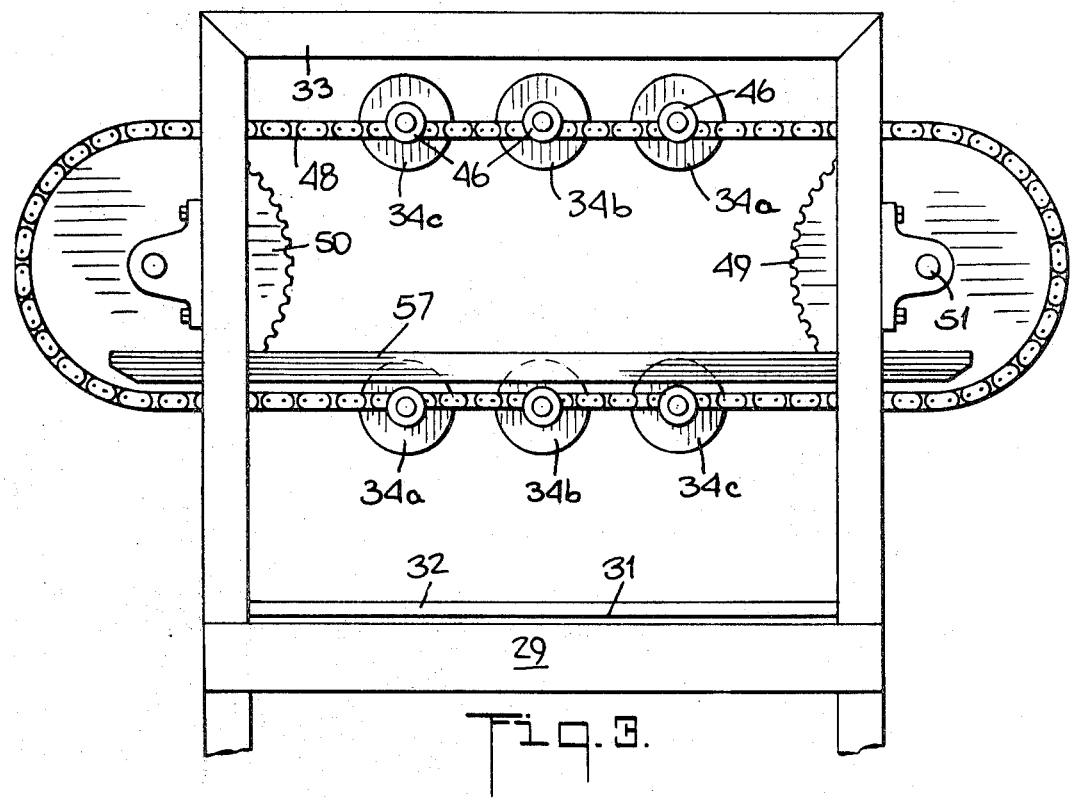
FIG. 3 is a vertical section view of a portion of the machine taken along line 3-3 in FIG. 2 and showing one of the height adjustments for the rollers with respect to the bed of the machine.
Figure 9:
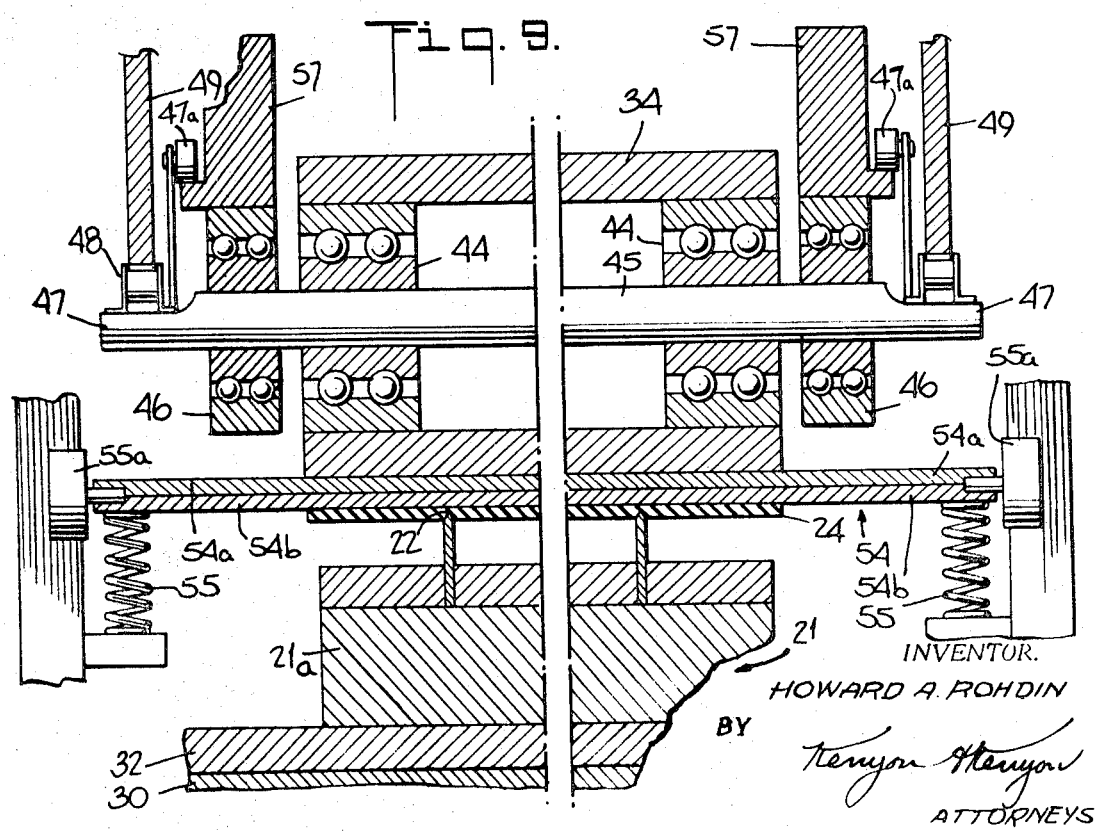
FIG. 9 is a fragmentary vertical section view taken along line 9-9 in FIG. 8 and showing a roller, the wear plate suspended adjacent to the roller, the workpiece, and the cutting die.

The particular superstructure 33 shown in FIG. 1 includes three rollers 34a, 34b, 34c. Each roller (FIG. 9) is mounted on bearings 44 which are supported by shafts 45; a second set of bearings 46 is mounted intermediate roller bearings 44 and the elongated flattened shaft ends 47 and the roller. The shaft ends 47 are attached to endless chains 48 which are driven by driving sprockets 49 and supported by driven sprockets 50 (FIGS. 3 and 4). Sprockets 49 are mounted on a shaft 51 which is connected through a chain drive mechanism 52 to a motor 53 (FIG. 1).

Figure 18:
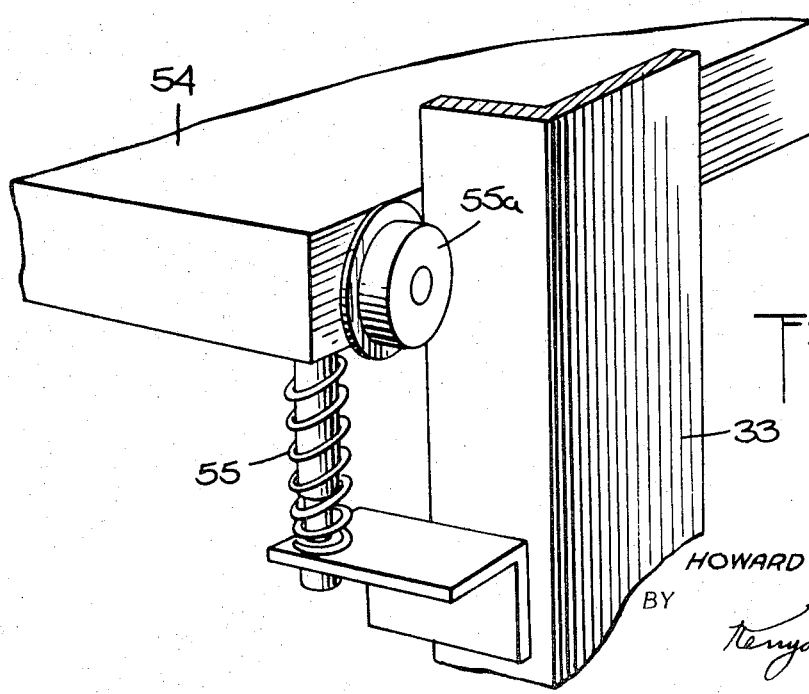
FIG. 18 is a fragmentary perspective view showing a resilient support for the roller wear plate.

A wear plate 54 (FIGS. 9 and 18) is mounted on the superstructure 33 by means of springs 55. Wheels 55a that can roll along the upstanding portions of the superstructure 33 prevent long movement of the wear plate. Alternatively, the wear plate 54 can be suspended by tension springs from the superstructure 33. In either wear plate mounting operation, the wear plate 54 lies in a plane between the rollers and the bed 29 (FIG. 4). The wear plate is suspended by the springs slightly above the plane of the cutting edges of the dies. In this way a clearance is provided between the bottom surface of the wear plate and the dies in order that the dies can be moved in and out beneath the wear plate. When the rollers advance and contact the wear plate, the wear plate is forced against the restraint of the suspending springs and toward the dies. Following the passage of the rollers across the wear plate, the springs elevate the wear plate to its rest position.

Furthermore, the wear plate 54 (FIG. 9) can comprise a sheet of hard steel or a laminated structure comprising a sheet of hard steel 54a secured to sheet 54b of soft metal, for example, aluminum or a plastic material such as polyethylene; the soft metal or plastic sheet 54b does not blunt the cutting edges of the die when that sheet engages the die during the cutting operation; use of the hard steel sheet 54a, that is in engagement with the rollers during the cutting operation, minimizes wearing of the plate 54.

Furthermore, the planar wear plate 54c (FIG. 25) can be modified to include indentations 54d for receiving portions of the workpiece, during the cutting operation. A wear plate of this design has particular utility when, for example, the blisters 25a to be cut from web 24a have upstanding flange portions 26a that would interfere with a planar wear plate that does not incorporate the aforesaid indentations during the cutting operation.

Figure 10:
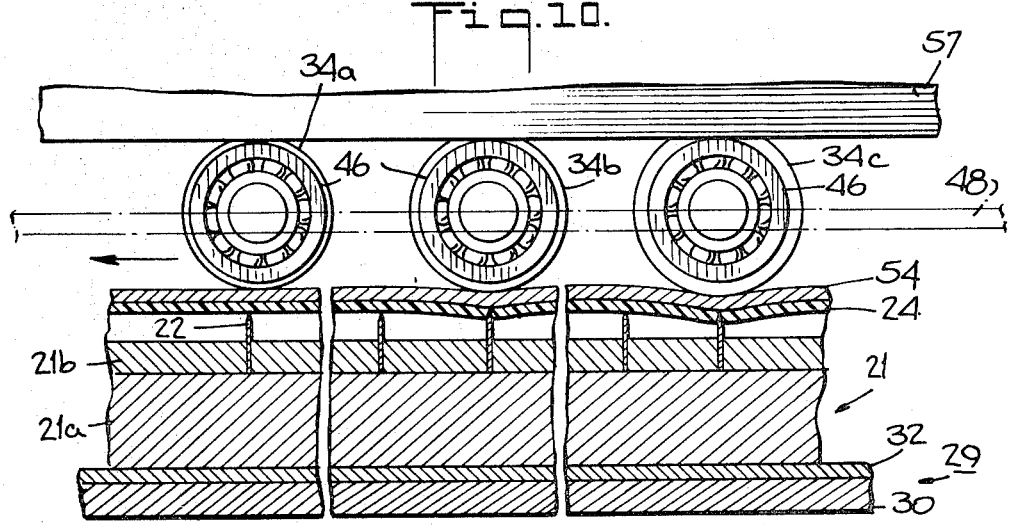
FIG. 10 is a fragmentary vertical section view showing one embodiment of the invention for incrementally increasing the cutting forces applied to the workpiece overlying the cutting die.

In operation of the machine 20 thus far described, one of the cutting dies 21 is moved onto the table 30 with a workpiece 24 disposed upon the die. The table is previously adjusted to position the plane of the cutting edges at a predetermined level with respect to the wear plate and the path of travel of the rollers. Motor 53 is then energized to drive chains 48 thereby driving rollers 34a, 34b and 34c across wear plate 54. During this time bearings 46 roll beneath rails 57 in the arrangement shown in FIG. 10. When an upward reactive force is applied to the rollers by the wear plate, the bearings are urged to roll against rail 57; however, since each of the rollers is provided with a successively larger diameter, the surface of each roller travels in a different horizontal plane. Therefore, each successive roller causes the wear plate to descend into a different horizontal plane with respect to the die. In this way each roller applies an incrementally increasing force through the wear plate 54 to the workpiece 24 to be cut. A complete cut can be made on one pass of the plurality of rollers. If necessary successive passes can be used to cut thicker material. Rollers 47a support shafts 47 (FIG. 9) and thereby rollers 34a—c (FIG. 3) along the lower reaches of chain 48 if the rollers are advanced without the wear plate in place.

Figure 11:
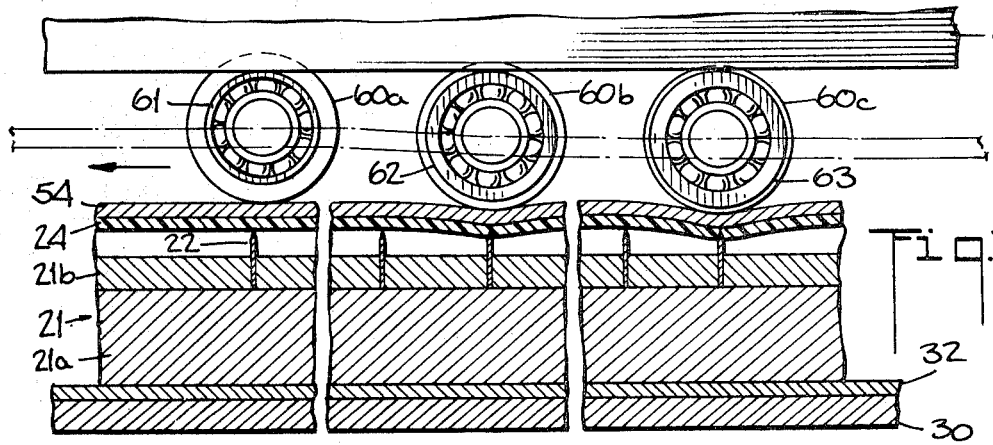
FIG. 11 is a fragmentary vertical section view showing another embodiment of the invention for incrementally increasing the cutting forces applied to the workpiece overlying the cutting die.

Another structure for generating incrementally increasing roller forces is shown in FIG. 11. In this embodiment three equidiameter rollers 60a, 60b, 60c are used. Bearings 61, 62, 63 are mounted on the roller shafts 45 of rollers 60a, 60b, 60c, respectively, intermediate the roller and the shaft end 47. Each of bearings 61, 62, 63 has a successively larger diameter.

The operation of the machine 20, incorporating this embodiment of roller apparatus, is analogous to the machine operation described above. Since bearings 61, 62, 63 are constrained to roll along the lower surface of pressure bars 57 while the workpiece is being cut, each roller 60a, 60b, 60c applies an incrementally larger force through the wear plate 54 to the workpiece 24 to be cut (FIG. 11).

Figure 12:
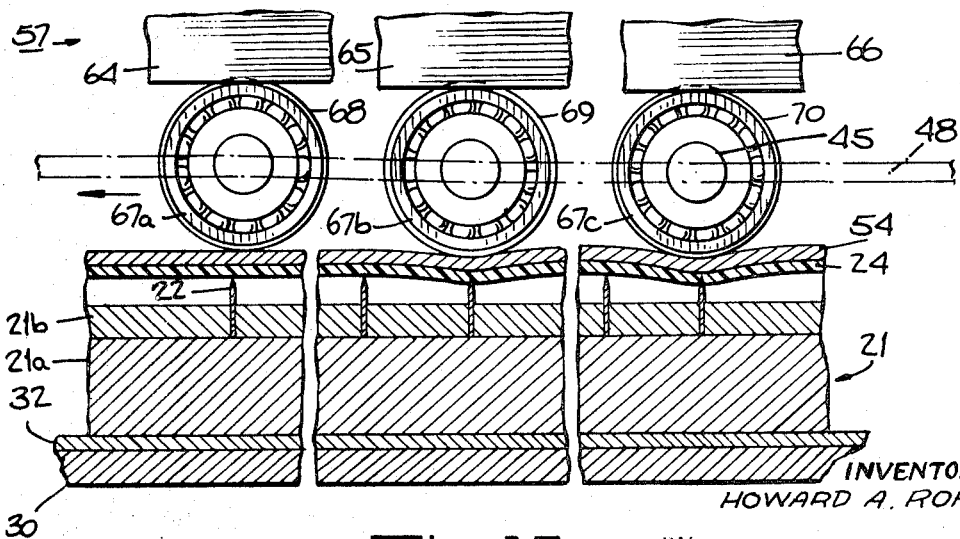
FIG. 12 is a fragmentary vertical section view of the invention for incrementally increasing the cutting forces applied to the workpiece overlying the cutting die.

Still another structure for generating incrementally increasing roller forces is shown in FIGS. 12 and 13. In this embodiment of machine 20, the superstructure 33 has assemblies 57 of pressure bars, that is, pressure bars 64, 65, 66, which are spaced laterally and substantially parallel to one another. The pressure bars are positioned progressively closer to the table in correspondence to the order in which the bearings of successive rollers arrive beneath the assembly of bars. In this way each successive roller is positioned closer to the cutting table 30 than the preceding one (FIG. 13). The equidiameter rollers 67a, 67b, 67c and the equidiameter bearings 68, 69, 70 are mounted on shafts 45 which are intermediate the rollers and the shaft ends 47.

The operation of the machine 20, incorporating this embodiment of roller apparatus, is analogous to the machine operation described above. Since the bearings 68, 69, 70 are constrained to roll along the lower surface of pressure bars 64, 65, 66 respectively, when the workpiece 24 is being cut, each roller 67a, 67b, 67c applies an incrementally larger force, through the wear plate 54 to the workpiece.

It is to be understood that, although the specific examples of a means for applying incrementally increasing roller forces to the workpiece 24 to be cut have included three cutting rollers, incremental cutting can be accomplished with a pair of rollers. Thus two cutting rollers can be used in any of the configurations shown in FIGS. 9—13, when it is necessary to develop only one incremental change in roller cutting force magnitude for each movement of the rollers across the wear plate. The use of more than three rollers, in any of the configurations shown in FIGS. 9—13 enables smaller increments, in roller cutting force magnitude to be developed. In addition, wear plate 54 can be omitted to allow the rollers directly to engage the workpiece.

In addition, incrementally increasing roller cutting forces can be developed, according to the invention, with the use of one roller, that makes successive movements across the wear plate. To accomplish incremental applications of varying force to the wear plate by means of an assembly having one roller, it is necessary to utilize one of the three variable elements discussed above, namely for different roller diameters, the different bearing diameters, or the different pressure bar positions.

By way of example, in employing the variable of different pressure bar positions in a machine having but one roller, pressure bars 57 and the supporting portions of superstructure 33 can be mechanically shifted, by means of the movement of cams, gear trains, actuators or similar motion transfer mechanism coupled to the drive shaft of motor 53 or to the chain drive mechanism 52. The shift of position would be a predetermined motion or motions which would follow each successive movement of the one roller across the wear plate. Thus the coupling mechanism would lower the pressure bars 57 by a preselected distance for each pass of the roller. As a result, the roller cutting force developed by the next succeeding movement of the roller across the wear plate would be incrementally larger than the force developed by the preceding movement of the same roller across the wear plate.

Thus it can be seen that the roller die cutter of the invention, by virtue of the progressive application of different forces to the wear plate by each of the rollers, enables cutting of the workpiece to be accomplished in one swift pass of the roller assembly over the roller dies. Thus the unique incremental cutting procedures of the invention eliminate difficulties related to the peripheral length of the roller dies' cutting edges and in addition it minimizes the requirements of "make ready."

A further advantage of the roller die cutter of the invention is that at any given time two different-shaped dies can be alternately delivered to the table from either side of the machine at the same time. Thus the two-sided shuttle operation enables the production of the machine to be doubled as compared to a conventional roller die cutter.

In addition, the concept of progressive application of different forces to the wear plate can be employed, not only in a roller cutting machine, but also in a machine that makes laminated structures, and in a machine that embosses a variety of material, as well as a die punch or pressing machine in which the wear plate serves as a male die and the bed serves as a female die.

In particular, each cutting die 21 is placed on a different movable tabletop 75, 76 (FIG. 14). In FIG. 14 the top at the right in the drawing is held in a rest position at the right side of the machine under the restraining force of spring 77. An air-actuated piston 79 is actuated to move tabletop 76 from the left side of the machine on to the bed 29. In this position, the tabletop 76 actuates a switch (not shown) which locks out the air-actuated piston 80 connected to tabletop 75, thereby preventing movement of tabletop 75, until tabletop 76 is removed from the bed 29.

At the same time that the lockout switch is operated, the tabletop 76 also actuates a switch (not shown) to energize motor 53, thereby driving the rollers to cut the workpiece positioned on the die.

When the roller movement is completed, motor 53 is deenergized and another switch (not shown) is actuated by the arrival of the rollers at their rest position to release the lock on piston 79. At the same time, table 76 is restored to its rest position by spring 78, thereby actuating a switch (not shown) to enable the operation of piston 80. At this time, either piston 79, 80 can be actuated, however, as described above, actuation of one piston automatically prevents activation of the other piston. The operation of piston 80 and the switches related thereto are similar to the operation and switches of piston 79.

As a result of this automatic shuttle feed operation, combined especially with incrementally cutting, twice the average daily production, that can be obtained on a conventional roller diecutting machine, can be obtained on a machine constructed in accordance with the invention. Of course, when a high rate of production is not required, a single tabletop operating from one side of the machine can be used.

Figure 17:
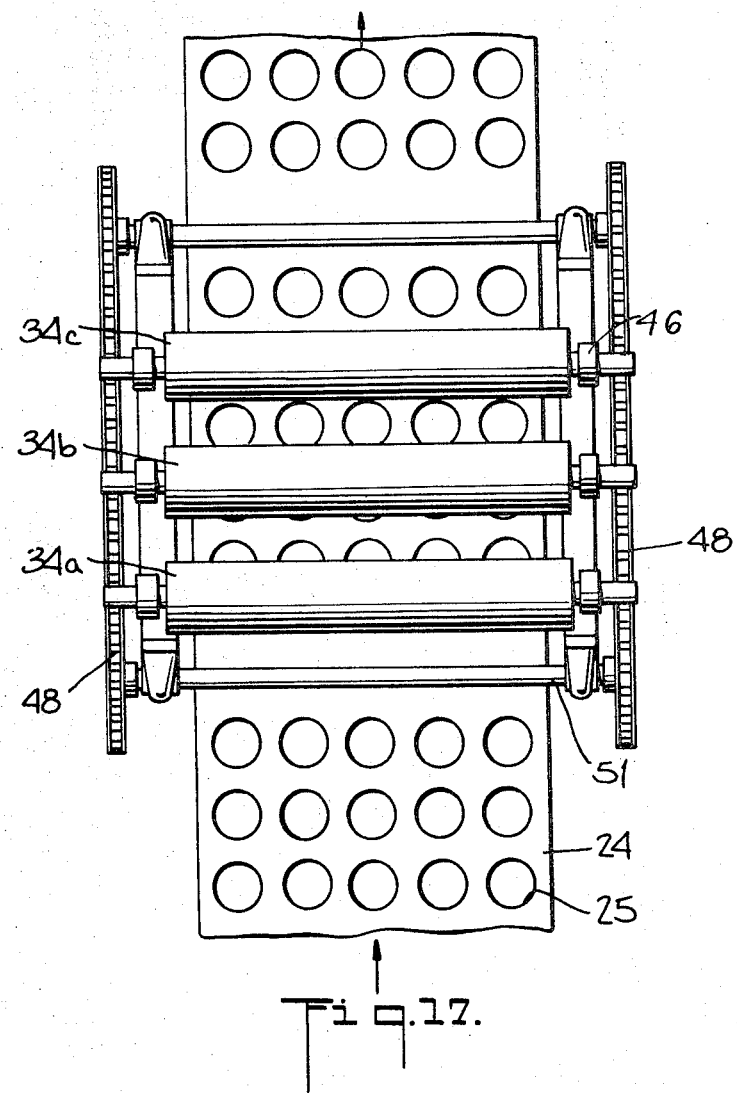
FIG. 17 is a plan view of an embodiment of the machine of the invention in which the blisters are advanced in the same direction during feeding into and during discharge from the machine.

Another arrangement is shown in FIG. 17 for increasing production. Here the web 24 of blisters 25 is moved along the line of travel of rollers 34a—c rather than at right angles as in the machine 20 of FIG. 1. As shown in FIG. 17, the web advances in the same direction as that of the lower reach of the rollers where the cutting operation is performed. With this arrangement, the need of reciprocating feeding and withdrawing motions is eliminated.

Cutting die assembly 21, as shown in FIG. 6, includes a plurality of dies 22 which have cutting edges 22a disposed in a substantially common flat plane. With such a die assembly, the workpiece 24 is subjected to a plurality of cuts disposed in a common flat plane overlying the plane in which the cutting edges are disposed. FIG. 22 shows cutting die assembly 87, which is adapted to produce cuts which extend in a three-dimensional manner as compared to a planar arrangement of cuts. The die assembly which is adapted to be mounted upon table 30 overlying bed 29 of machine 20 includes support 88 in which dies 89 are mounted. Cutting edges 89a of the dies extend upwardly as shown in FIG. 22. Workpiece 90 overlies cutting edges 89a. Wear plate 91 which is contoured to mate with the contour of cutting edges 89a, is placed over workpiece 90.

Rollers 92 serve as the means for applying progressively increasing pressure to wear plate 91. The rollers can be urged toward the wear plate and made to apply an incrementally increasing pressure thereto by any of the arrangements previously shown for machine at 20. As shown in FIG. 22, the rollers are mounted upon shafts 93 which carry outboard bearings 94. Track 95 is shaped to correspond to the contour of cutting edges 89a and the wear plate 91.

Rollers 92 are advanced in the direction of the arrows shown in FIG. 22. The leading roller has the minimum outside diameter and the trailing roller has the maximum outside diameter. As the rollers are advanced, they urge wear plate 91 with progressively increasing force against wear plate 91, so that workpiece 90 is progressively cut by cutting edges 89a.

In the arrangement shown in FIG. 23, die assembly 87 having contoured cutting edges 89a and a contoured work plate 91 is employed; however, the working surface is formed by the lower surface 96a of work plate 96. Thus the lower surface, surface 96a, of plate 96 is formed to mate with the contour of cutting edges 89a. Upper surface 96b of plate 96 serves as the wear surface along which rollers 92 operate. The rollers which move in the direction of the arrows in FIG. 23 have progressively increasing diameters. The rollers are urged with incrementally increasing forces against surface 96b by the engagement of bearings 94 with track 97 which has flat surface 97a in engagement with the bearings. With the arrangement of FIG. 23, the drive to the rollers is simplified since the rollers operate in substantially a common plane.

FIG. 24 shows diecutting assembly 98 having dies 99. Workpiece 100 is placed over the dies. Between areas 100a of the workpiece which are to be cut out by dies 89, there is disposed areas 100b which extend above the plane in which areas 100a extend. In order to limit the cutting action to areas 100a, and at the same time to clear areas 100b, the rollers for applying an incrementally increasing pressure to the workpiece, namely rollers 101, are provided with a work portion 101a of one diameter and a necked-down portion 101B of a smaller diameter. The necked arrangement can be repeated along the length of the roller and the diameters can be varied along the length of the roller. With the construction of FIG. 24, a great variety of workpieces and die configurations can be accommodated while utilizing the procedure of progressively cutting workpiece against the die by the application of pressure to a workpiece from a plurality of rollers. It should be noted that with the construction shown in FIG. 24, a wear plate can be disposed between roller 101 and workpiece 100 as shown in the various other embodiments of the invention.

In the embodiments of the invention shown in FIGS. 1, 3, 4 and 9, rollers 34a—c are advanced by chain 48 to pass with respect to workpiece 24 in order to cut the workpiece incrementally upon dies 21. Each successive roller has its surface travelling in a path of travel which is closer to the die as compared to the preceding roller. As a result each successive roller can provide an increasing degree of engagement between the surface of the roller and the workpiece or the wear plate if one is used. As shown in FIG. 26, dies 102 are mounted upon carriage 103 which is adapted to be transported along supporting surface 104 by linear actuator or ram 105. Workpiece 106 is placed in an overlying relationship with respect to dies 102. Depending upon the nature of the workpiece and the form of dies 102, it may be desirous to employ wear plate 107 overlying the workpiece placed upon the dies.

Rollers 108a—c are each adapted to provide an incrementally increasing degree of engagement with the passage of wear plate 107 or work piece 106 disposed upon dies 102 as they are advanced beneath rollers 108a—c. As shown in FIG. 26, each successive roller of rollers 108a—c has an increasingly larger diameter and therefore each successive roller provides a greater degree of engagement with wear plate 107 when carriage 103 is advanced to the left as viewed in FIG. 26 by linear actuator 105. As has been previously discussed, instead of rollers with increasing diameters, the positioning of rollers 108a—c with respect to the path of travel of wear plate 107 can be relied upon in providing an incrementally increasing degree of engagement.

It is to be further understood that although specific embodiments of the invention have been described and shown, variations in structural detail within the scope of the appended claims are possible and are contemplated. There is no intention, therefore, of limitation to the exact abstract or disclosure herein presented.

I claim:
1. A machine for applying force to a workpiece comprising:
   a. means for supporting a workpiece;
   b. a plurality of rollers disposed substantially parallel to one another;
   c. means for rolling said plurality of rollers with respect to a workpiece positioned upon said supporting means to apply force to the workpiece; and
   d. means for incrementally increasing the engagement of successive rollers of said plurality of rollers by moving the axis of rotation of each successive roller at a decreasing interval with respect to the workpiece to incrementally increase the force to be applied by said rollers to the workpiece.

2. A machine in accordance with claim 1 in which said means for incrementally increasing the engagement of successive rollers of said plurality of rollers to incrementally increase the force to be applied by said rollers to the workpiece comprises:
   a. bearings means connected to each of said plurality of rollers, and
   b. means in engagement with said bearing means of said plurality of rollers for directing the axis of rotation of each of said plurality of rollers to travel in a different plane, whereby the engagement of each of said plurality of rollers with respect to said supporting means and the workpiece thereon can be incrementally increased.

3. A machine in accordance with claim 2 in which:
   a. said bearing means connected to each of said plurality of rollers comprises a bearing pivotally mounted at each of the opposite ends and about the rotational axis of each of said rollers, said bearing having a circular outer portion, the outside diameter of said bearing of each successive roller in a direction opposite to the direction of travel being greater than the outside diameter of said bearing of the preceding roller; and
   b. said means in engagement with said bearing means of said plurality of rollers for directing the axis of rotation of each of said plurality of rollers to travel in a different plane comprises a track disposed adjacent each of the opposite end portions of said plurality of rollers and extending parallel to the direction of travel of said plurality of rollers in engagement with the surface of the circular outer portions of each of said bearings which is opposite said means for supporting a workpiece, the engagement of said track with said bearing having increasing outside diameters causing said plurality of rollers to incrementally increase the force applied to the workpiece.

4. A machine in accordance with claim 1 in which said means for incrementally increasing the engagement of successive rollers of said plurality of rollers to incrementally increase the force to be applied by said rollers to the workpiece comprises:
   a. bearing means connected to each of said plurality of rollers, and
   b. means in engagement with said bearing means of said plurality of rollers for directing the axis of rotation of each of said plurality of rollers to travel in different paths extending parallel to one another, whereby the engagement of each of said plurality of rollers with respect to said supporting means and the workpiece thereon can be incrementally increased.

5. A machine for applying force to workpiece comprising:
   a. means for supporting a workpiece;
   b. a plurality of rollers disposed substantially parallel to one another;
   c. means for rolling said plurality of rollers with respect to a workpiece positioned upon said supporting means to apply force to the workpiece; and
   d. a plurality of means corresponding in number to said plurality of rollers for guiding each of said plurality of rollers to roll along a different path with respect to said supporting means by moving the axis of rotation of each successive roller at a decreasing interval with respect to the workpiece, the path of each successive roller being nearer to said supporting means in order to incrementally increase the force to be applied by said plurality of rollers to the workpiece.

6. A machine in accordance with claim 5 in which said plurality of means for guiding each of said plurality of rollers to roll along a different path with respect to said supporting means comprises:
   a. bearing means connected to each of said plurality of rollers including a bearing pivotally mounted at each of the opposite ends and about the rotational axis of each of said rollers, the interval between said bearing of each of said plurality of rollers being different; and
   b. means in engagement with said bearing means of said plurality of rollers for directing the axis of rotation of each of said plurality of rollers to travel in a different path including a plurality of tracks disposed adjacent each of the opposite end portions of said plurality of rollers and extending parallel to the direction of travel of said plurality of rollers, each of said plurality of tracks being adapted to engage an outer portion of a different one of said bearing means which is opposite said means for supporting a workpiece, each pair of said plurality of tracks being adapted to engage said bearing means at each of the opposite ends of a different one of said plurality of rollers, each of said pairs of said plurality of tracks being positioned at a different interval with respect to said supporting means, the interval of each of said pair of tracks decreasing in accordance with the order of said rollers whose bearing means are to be engaged thereby, the order of said rollers being opposite to the direction in which said rollers travel.

7. A machine in accordance with claim 5, and further comprising at least one die cutter disposed upon said supporting means and in a facing relationship with said plurality of rollers, said die cutter being adapted to receive a workpiece upon the face thereof, whereby said plurality of rollers incrementally increase the force urging the workpiece against said die cutter.

8. A machine for applying force to a workpiece comprising:
   a. means for supporting a workpiece;
   b. a plurality of rollers disposed substantially parallel to one another, successive rollers or said plurality of rollers having increasing diameters for incrementally increasing the force to be applied by each successive roller means to the workpiece when said plurality of roller means are rolled with respect to the workpiece positioned upon said supporting means;
   c. means for rolling said plurality of roller means with respect to a workpiece positioned upon said supporting means; and
   d. means in engagement with said plurality of rollers for directing the axis of rotation of each of said plurality of rollers to travel in a predetermined path extending along said supporting means and extending toward and away from said supporting means whereby force can be applied to a workpiece having a surface adapted to extend toward and away from said supporting means.

9. A machine in accordance with claim 8 in which said means in engagement with said plurality of rollers for directing the axis of rotation of each of said plurality of rollers to travel in a predetermined path comprises a contoured track in engagement with the opposite ends of each of said plurality of rollers.

10. A machine in accordance with claim 8 and further comprising at least one die cutter disposed upon said supporting means and in a facing relationship with said plurality of rollers, said die cutter being adapted to receive a workpiece upon the face thereof, whereby said plurality of rollers incrementally increase the force urging the workpiece against said die cutter.

11. A machine for applying force to a workpiece comprising:
   a. means for supporting a workpiece,
   b. a plurality of roller means disposed substantially parallel to one another for incrementally increasing the force to be applied by each successive roller means to the workpiece when said plurality of roller means are rolled with respect to the workpiece positioned upon said supporting means,
   c. means for rolling said plurality of roller means with respect to a workpiece positioned upon said supporting means to apply force to the workpiece, and
   d. means for incrementally increasing the engagement of successive rollers of said plurality of roller means for directing the axis of rotation of each of said plurality of roller means to travel in a predetermined path extending along said supporting means and extending toward and away from said supporting means, whereby force can be applied to a workpiece having a surface adapted to extend toward and away from said supporting means.

12. A machine in accordance with claim 11 in which said means for incrementally increasing the engagement of successive roller means of said plurality of roller means and directing the axis of rotation of each of said plurality of roller means to travel in a predetermined path includes a contoured track in engagement with the opposite ends of each of said plurality of roller means.

13. A machine in accordance with claim 11 and further comprising at least one die cutter disposed upon said supporting means and in a facing relationship with said plurality of roller means, said die cutter being adapted to receive a workpiece upon the face thereof, whereby said plurality of roller means incrementally increase the force urging the workpiece against said die cutter.

14. A machine for applying force to a workpiece comprising:
   a. means for supporting a workpiece;
   b. at least one roller;
   c. means for rolling said roller with respect to a workpiece positioned upon said supporting means to apply force to the workpiece;
   d. means for incrementally increasing the engagement of said roller during successive passes thereof to incrementally increase the force to be applied by said roller to the workpiece; and e. means for directing the axis of rotation of said roller to travel in a predetermined path extending along said supporting means and extending toward and away from said supporting means, whereby force can be applied to a workpiece having a surface adapted to extend toward and away from said supporting means.

15. A machine for applying force to a workpiece comprising:
   a. means for supporting a workpiece;
   b. a plurality of roller means disposed substantially parallel to one another for incrementally increasing the force to be applied by each successive roller means to the workpiece when said plurality of roller means are rolled with respect to the workpiece positioned upon said supporting means, said plurality of roller means including a plurality of rollers, each of said rollers having different outside diameters along the length thereof which are adapted to mate with a workpiece having a contoured surface; and
   c. means for rolling said plurality of roller means with respect to a workpiece positioned upon said supporting means.

16. A machine for applying force to a workpiece comprising:
   a. means for supporting a workpiece;
   b. a plurality of rollers disposed substantially parallel to one another, each of said plurality of rollers having different outside diameters along the length thereof which are adapted to mate with a workpiece having a contoured surface;
   c. means for rolling said plurality of rollers with respect to a workpiece positioned upon said supporting means to apply force to the workpiece; and
   d. means for incrementally increasing the engagement of successive rollers of said plurality of rollers to incrementally increase the force to be applied by said rollers to the workpiece.

17. A roller diecutting machine comprising:
   a. a die cutter having a contoured surface;
   b. a work plate having a surface facing the contoured surface of said die cutter and adapted to form a mating engagement therewith, the workpiece being adapted to fit between said die cutter and said work plate;
   c. roller means for incrementally increasing the force to be applied to the workpiece when said roller means is rolled with respect to said work plate and said die cutter to apply force to the workpiece positioned therebetween; and
   d. means for rolling said roller means with respect to said work plate and said die cutter to apply force thereto.

18. The method of applying incrementally increasing forces to a workpiece comprising the steps of:
   a. positioning the workpiece on a support;
   b. rolling at least one roller with respect to the workpiece and in a predetermined degree of engagement therewith to apply force thereto; and
   c. increasing the degree of engagement of the roller with respect to the workpiece over the predetermined degree of engagement during subsequent rolling of the roller with respect to the workpiece.

19. The method of applying incrementally increasing forces to a workpiece comprising the steps of:
   a. positioning the workpiece on a support;
   b. rolling a plurality of rollers with respect to the workpiece to apply force thereto; and
   c. increasing the degree of engagement of each successive roller of the plurality of rollers with respect to the workpiece by moving the axis of rotation of each successive roller at a decreasing interval with respect to the workpiece.

20. A method of applying incrementally increasing forces to a workpiece comprising the steps of:
   a. positioning the workpiece with respect to a support having a contoured surface with a predetermined form;
   b. rolling a plurality of rollers with respect to the workpiece to apply force thereto, the rolling being confined to a path of travel corresponding to the predetermined form of the contoured surface; and
   c. increasing the degree of engagement of each successive roller of the plurality of rollers with respect to the workpiece by causing the axis of rotation of each successive roller to be at a decreasing interval with respect to the workpiece.

21. A method of applying incrementally increasing forces to a workpiece in accordance with claim 20 in which the step of positioning the workpiece upon a support comprises placing the workpiece upon a cutting die having a contoured face with a predetermined form, whereby the increasing degree of engagement of each successive roller of the plurality of rollers with respect to the workpiece causes the workpiece to be cut with respect to the cutting die.

22. A method of applying incrementally increasing forces to a workpiece comprising the steps of:
   a. positioning the workpiece with respect to a support having a contoured surface with a predetermined form;
   b. rolling at least one roller with respect to the workpiece and in a predetermined degree of engagement therewith to apply force thereto, the rolling being confined to a path of travel corresponding to the predetermined form of the contoured surface; and
   c. increasing the degree of engagement of the roller with respect to the workpiece over the predetermined degree of engagement during subsequent rolling of the roller with respect to the workpiece.

23. A method of applying incrementally increasing forces to a workpiece in accordance with claim 22 in which the step of positioning the workpiece upon a support comprises placing the workpiece upon a cutting die having a contoured face with a predetermined form, and the step of rolling comprises rolling a plurality of rollers with respect to the workpiece, whereby the increasing degree of engagement of each successive roller with respect to the workpiece causes the workpiece to be cut with respect to the cutting die.

24. A method of applying incrementally increasing forces to a workpiece comprising the steps of:
   a. positioning the workpiece between a cutting die having a contoured face with a predetermined form and a work plate having a face adapted to fit with mating engagement with the contoured face of the cutting die;
   b. rolling a plurality of rollers with respect to the work plate and the cutting die to apply cutting force to the workpiece; and
   c. increasing the degree of engagement of each successive roller of the plurality of rollers with respect to the workpiece by moving the rolling surface of each successive roller to a decreasing interval with respect to the workpiece.

25. A method of applying incrementally increasing forces to a workpiece comprising the steps of:
   a. positioning the workpiece between a cutting die having a contoured face with a predetermined form and a work plate having a face adapted to fit with a mating engagement with the contoured face of the cutting die;
   b. rolling at least one roller with respect to the work plate and the cutting die in a predetermined degree of engagement therewith to apply cutting force to the workpiece; and
   c. increasing the degree of engagement of the roller with respect to the work plate and the die cutter over the predetermined degree of engagement during subsequent rolling of the roller.

26. A method of applying incrementally increasing forces to a workpiece comprising the steps of:
   a. positioning the workpiece on a support;
   b. rolling a plurality of rollers with respect to the workpiece to apply force thereto, the outside diameter of each of the rollers varying along the length thereof in accordance with a predetermined form to control the application of force to the workpiece; and c. increasing the degree of engagement of each successive roller of the plurality of rollers with respect to the workpiece by moving the rolling surface of each successive roller to a decreasing interval with respect to the workpiece.

27. A method of applying incrementally increasing forces to a workpiece comprising the steps of:

a. positioning the workpiece on a support;

b. rolling at least one roller with respect to the workpiece and in a predetermined degree of engagement therewith to apply force thereto, the outside diameter of the roller varying along the length thereof in accordance with a predetermined form to control the application of force to the workpiece; and c. increasing the degree of engagement of the roller with respect to the workpiece over the predetermined degree of engagement during subsequent rolling of the roller with respect to the workpiece.